United States Patent [19]

Ferrante et al.

[11] Patent Number: 5,587,932

[45] Date of Patent: Dec. 24, 1996

[54] ON-BOARD MEASUREMENT SYSTEM

[75] Inventors: Joseph V. Ferrante, Redmond; Mark E. Lockman, Everett; Donald P. Matson, Mukilteo; John A. Gibbs, Lynnwood; Warren H. Wong, Seattle, all of Wash.

[73] Assignee: Fluke Corporation, Everett, Wash.

[21] Appl. No.: 285,952

[22] Filed: Aug. 4, 1994

[51] Int. Cl.⁶ .............................. G06F 15/00; G06F 17/40
[52] U.S. Cl. .................... 364/556; 364/550; 364/551.01; 364/579
[58] Field of Search ..................... 364/556, 468, 364/469, 478, 550, 551.01, 557, 558, 566, 508, 579, 580, 222.1, 226.7, 917, 917.5, 917.6, 917.9, 422; 346/33 R, 33 B; 73/431, 426

[56] References Cited

U.S. PATENT DOCUMENTS

| | | | |
|---|---|---|---|
| 4,114,450 | 9/1978 | Shulman et al. | 364/566 X |
| 4,136,561 | 1/1979 | Mueller et al. | 73/431 X |
| 4,470,660 | 9/1984 | Hillegonds et al. | 350/96.21 |
| 4,553,813 | 11/1985 | McNaughton et al. | 350/96.20 |
| 4,608,532 | 8/1986 | Ibar et al. | 364/556 X |
| 4,715,002 | 12/1987 | Vernon et al. | 364/422 |
| 4,745,564 | 5/1988 | Tennes et al. | 364/566 |
| 4,817,049 | 3/1989 | Bates et al. | 364/917 |
| 5,162,725 | 11/1992 | Hodson et al. | 364/550 X |
| 5,365,462 | 11/1994 | McBean, Sr. | 364/550 X |
| 5,426,595 | 6/1995 | Picard | 364/550 X |
| 5,444,637 | 8/1995 | Smesny et al. | 364/556 |

*Primary Examiner*—Emanuel T. Voeltz
*Assistant Examiner*—M. Kemper
*Attorney, Agent, or Firm*—Dellett and Walters

[57] ABSTRACT

An on-board measurement system includes a plurality of measurement modules each provided with internal or external transducers and a control module for conducting desired testing procedures. The modular logging apparatus is removably secured to a product undergoing a manufacturing process or the like whereby numerous or substantially continuous measurements can be made of environmental factors affecting a product. The control module also receives and stores measured data for later retrieval.

33 Claims, 3 Drawing Sheets

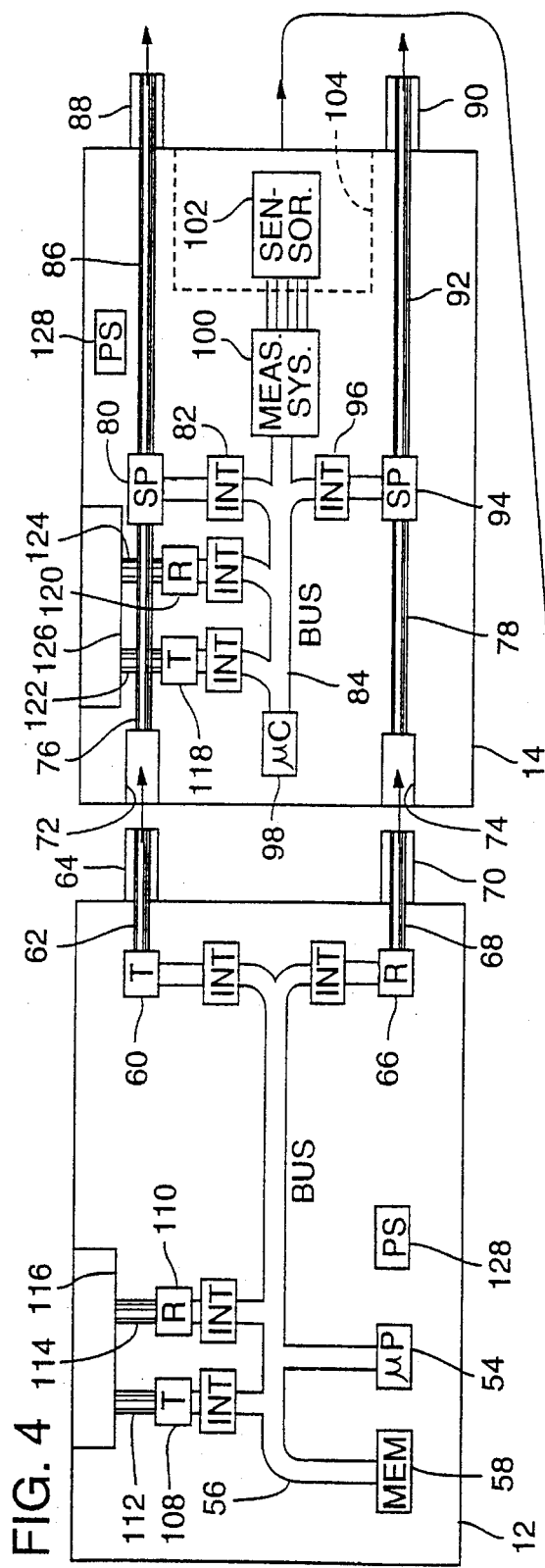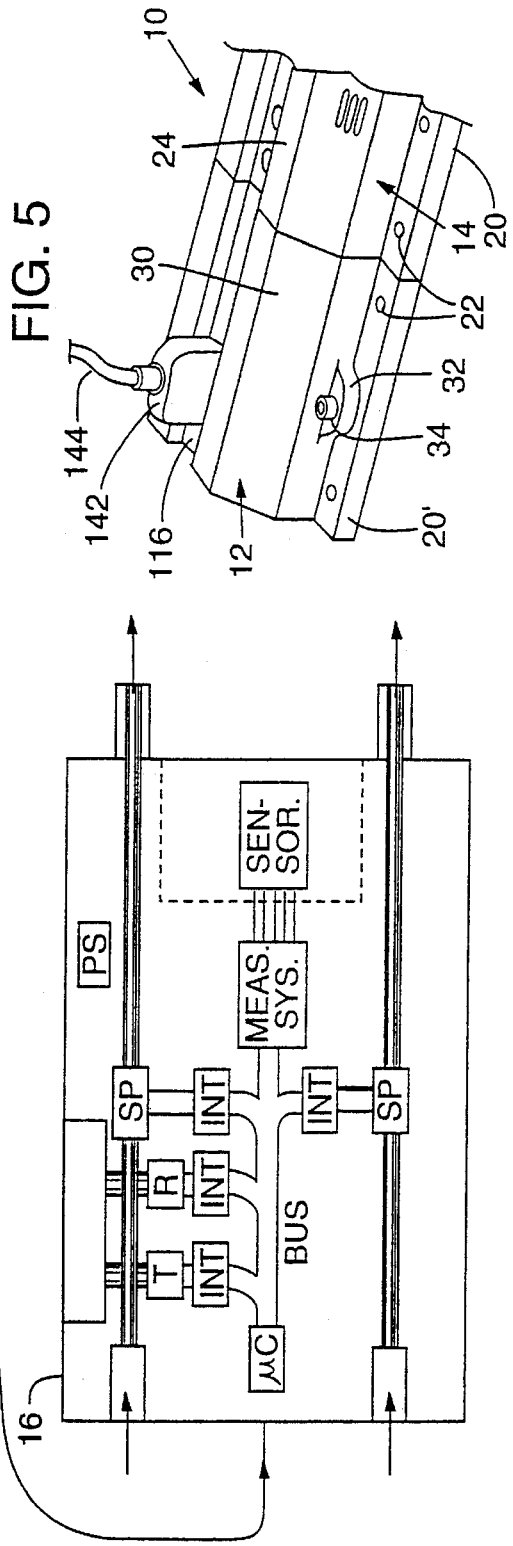

ON-BOARD MEASUREMENT SYSTEM

BACKGROUND OF THE INVENTION

The present invention relates to a measuring method and apparatus for providing a record of environmental factors to which a product is exposed during a manufacturing process or the like and particularly to such a method and apparatus for generating substantially continuous data.

Manufacturing processes are designed to operate in a predetermined manner wherein environmental factors, especially those which may be critical to the process, are controlled within acceptable tolerances. Depending upon the process, it may be desirable to control pressure, radiation, vibration, temperature, humidity, pH or other parameters to which a product is exposed. Although it is possible to monitor these factors with instruments positioned at various stages in the process, the actual parameters to which a manufactured product is subjected at other stages may be relatively unknown because of harsh environmental conditions or inconvenience of probing those areas. For example, some manufacturing processes involve extremes in temperature, acidity, alkalinity, and the like where the interposition of test leads is difficult or impractical. In any case, it is not generally feasible to explore multiple parameters at every stage along a manufacturing process even in the absence of extremes. Rather, the data is discontinuous, containing gaps, wherein data, if it were available, might have revealed unacceptable conditions potentially resulting in a flawed or even dangerous end product.

SUMMARY OF THE INVENTION

In accordance with the apparatus and method of the present invention, an on-board measurement system comprising a control module and a plurality of measurement modules is attached to a movable unit or product for logging data concerning environmental factors on a substantially continuous basis. Thus, rather than only externally probing the environment to which the product is exposed, substantially all environmental data is gathered or at least available regardless of the path taken by the product. Thus, conditions experienced by the product are fully measured rather than being only approximately known, whereby the process can be controlled in an improved manner.

Separate modules are adapted to measure separate parameters such as temperature, humidity, radiation, vibration, voltage or the like and are suitably positioned in line for communication with a common control module having microprocessor means for programming a measurement sequence and including memory means for collecting data from the measurement modules. The modules are sealingly enclosed, being formed of an environment impervious material, and are suitably coupled together via optical links. An additional optical transceiver is utilized for coupling an external command computer to the control module for initially programming the system, e.g. for taking specified measurements at given time intervals, and for receiving stored data for analysis and display. Information from the control module can be downloaded while the control module is still attached to the product. Alternatively, the control module can be removed from the measurement modules and replaced, after which the removed control module is read out.

It is accordingly an object of the present invention to provide an improved process measuring method and system.

It is another object of the present invention to provide a rugged measurement system which is attachable to a movable unit in a process environment in order to log the environmental parameters experienced by such unit.

It is a further object of the present invention to provide an improved apparatus and method for substantially continuously logging parameters to which a movable product or the like is subjected.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 4 is a schematic representation, partially in block diagram form, of measurement apparatus according to the present invention including a control module and one or more measurement modules adapted for joinder in an in-line configuration; and FIG. 5 is a partially broken-away view of apparatus according to the present invention wherein a control module is engaged by a transceiver plug connected for electronic communication with a command computer.

DETAILED DESCRIPTION

Figure 1:
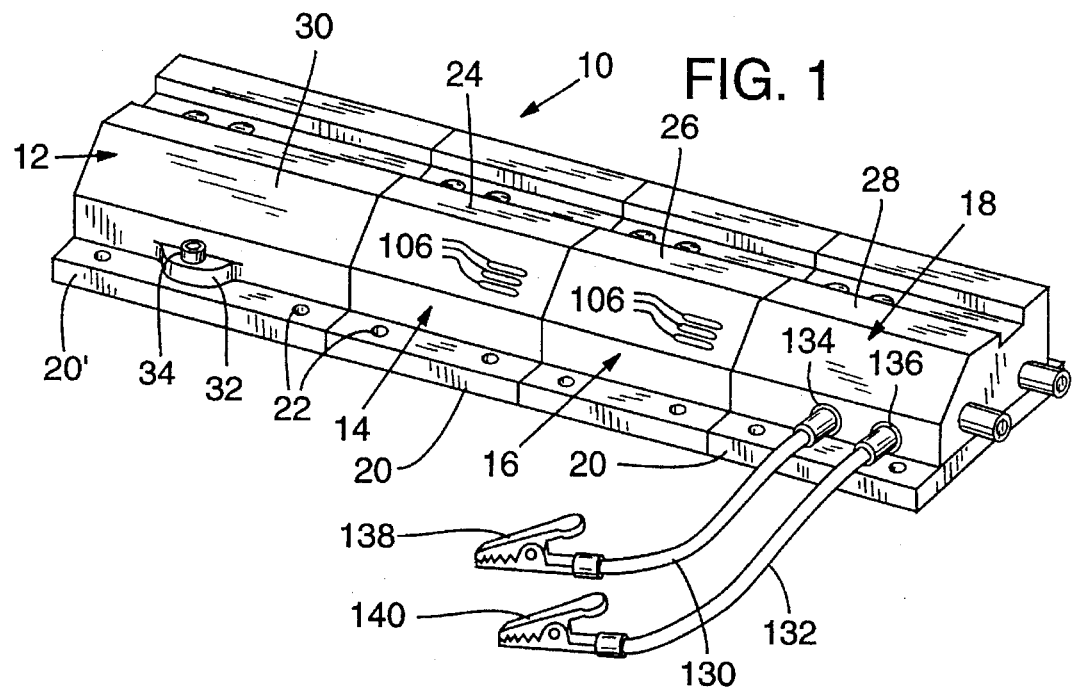
FIG. 1 is a perspective view of apparatus according to the present invention for logging parameters to which a movable unit in a process environment is subjected.

Referring to the drawings and particularly to FIG. 1, illustrating an on-board logging apparatus according to the present invention, such apparatus includes a control module 12 and plural measurement modules 14, 16 and 18 disposed in an in-line configuration. The modules are desirably formed of environment impervious material which suitably comprises glass or ceramic, or a plastic capable of withstanding high temperatures. Alternatively, in some environments a metal construction is suitable, but obviously the material depends upon the particular circumstances with the end in view being a rugged construction capable of withstanding harsh conditions. Each of the modules is provided with a lower, flat base portion 20 adapting the same for attachment to a unit or product via fastener holes 22 disposed proximate lateral edges of the base portion. Base portion 20 for measurement modules 14, 16 and 18 is secured through the underside thereof by fastener means (not shown) to the module sections 24, 26 and 28 thereabove, but control module upper section 30 is suitably provided with side ears 32 receiving fasteners 34 adapted for holding upper portion 30 to lower base portion 20'. By disengagement of fasteners 34, control module 12 is easily disengaged and removed from the product being manufactured or processed, as well as from the adjoining measurement module 14.

Figure 2:
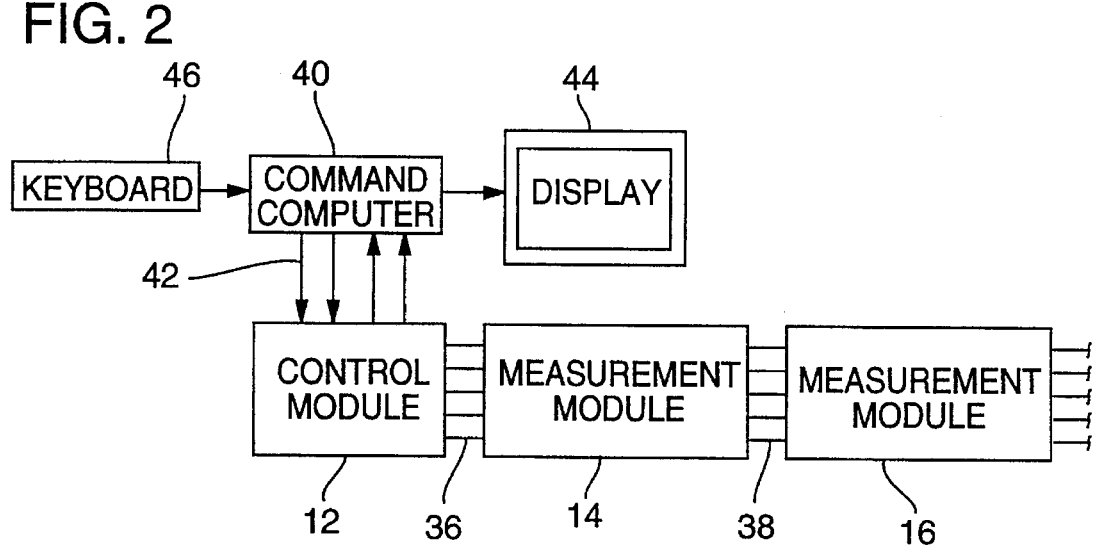
FIG. 2 is a block diagram of the measurement system according to the present invention.

Referring to FIG. 2, comprising a block diagram of the measurement system according to the present invention, control module 12 is used for directing operation of measurement modules 14 and 16 by way of intermodule bus connections 36 and 38 which may include conventional plug and socket arrangements for communicating digital data and control signals between the modules. In addition, the control module 12 is selectably connected to an external command computer 40 via control and data bus 42 for the purpose of initially programming the control module as well as receiving data therefrom. Command computer 40 is supplied with a display unit 44, suitably of the cathode ray tube or LCD variety, and a manually operated keyboard 46. While connections 36, 38 and 42 are suitably buses with conventional plug and socket means for interconnecting modules, optical means as hereinafter more fully described are preferred in order to render the measurement system comprising elements 12, 14 and 16 more impervious to the immediate environment.

Command computer 40 and means 44 and 46 are not physically part of the measurement apparatus attached to the product under test, but rather the command computer is connected to control module 12 only periodically for programming the logging apparatus, and receiving data therefrom. For instance, keyboard 46 may be employed in conjunction with computer 40 and display unit 44 for designing a testing regime and developing a measuring program which is then downloaded to control module 12. The command computer is disconnected and subsequently, after the on-board measuring apparatus comprising modules 12, 14 and 16 has passed through an entire process sequence, command computer 40 is re-connected to module 12 for receiving measurement data stored therein. The measurement data is suitably portrayed on display means 44.

Figure 3:
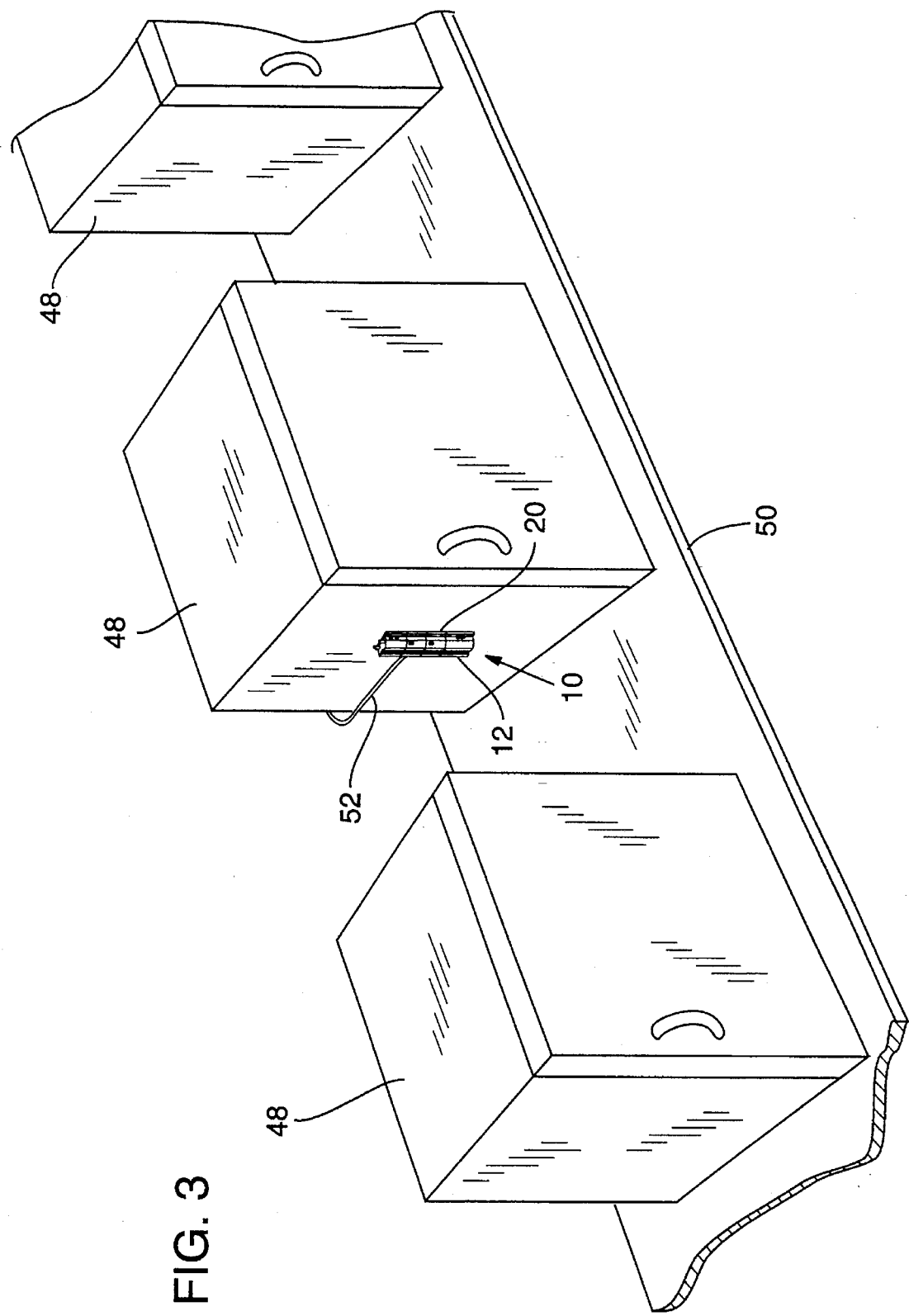
FIG. 3 is a perspective view of a typical production line wherein one of the products is provided with measurement apparatus according to the present invention.

Referring to FIG. 3, an on-board measurement apparatus 10 according to the present invention is illustrated as fastened to the side of one of a series of small refrigerators 48 passing along a conveyor 50. Apparatus 10 includes a control module 12 and a plurality measurement modules disposed in-line therewith. One of the measurement modules is provided with a test lead or cable 52 which is connected, by means not shown, to a voltage within the refrigerator, or alternatively, to a refrigerant temperature measuring sensor. Other of the measurement modules are suitably employed to measure ambient temperature, vibration, or the like.

The refrigerator is suitably supplied on the side or the back thereof with threaded sockets for receiving fasteners securing a measurement apparatus 10 to the side or back of the refrigerator. Alternatively, the base 20 may be magnetized for temporary attachment to the refrigerator. After the measurement apparatus 10 has been properly programmed, e.g. as illustrated in FIG. 2 to take periodic tests, the measurement apparatus 10 is disconnected from the command computer with apparatus 10 being secured as depicted in FIG. 3 to a refrigerator before the refrigerator passes through a given sequence of steps in a production process. One example is a process for providing an exterior finish thereupon. After the process is complete, the apparatus 10 or module 12 is disengaged from refrigerator 48 and re-connected to the command computer for read out of the data gathered in control module 10, or alternatively the data can be read out with apparatus 10 left in place employing an appropriate demountable optical link as hereinafter more fully described.

Referring to FIG. 4, illustrating circuitry within the respective modules in block diagram form, as well as certain physical aspects of the invention, control module 12 includes a microprocessor 54 connected via data and control bus 56 with memory 58 and a plurality of interface means, INT, which couple the computer bus to fiber optic transmitters and receivers. Fiber optic means are then employed for communicating between modules. However, other optical means suitable for transmitting information without an intervening fiber, or other inter-coupling means, can be substituted therefor.

Fiber optic transmitter 60 in this embodiment, suitably comprising an infrared light emitting diode or laser diode, is adapted to emit light by way of a fiber optic link comprising fiber 62 extending coaxially within longitudinal end prong 64 protruding from one end of control module 12. Also, a fiber optic receiver 66 comprising an infrared sensitive photodiode is employed for communicating between computer bus 56 and fiber optic member 68 extending coaxially within end prong 70 also disposed at the end of control module 12 in spaced parallel relation to prong 64. The optical fibers desirably extend to the tip ends of prongs 64 and 70.

The prongs 64 and 70 provide both physical connection and digital communication between the modules, the prongs or plugs 64 and 70 being closely receivable within sockets 72 and 74 of measurement module 14, whereby, when the prongs are fully engaged with the sockets, the control module and measurement module abut one another in the manner illustrated in FIG. 1 while the tip ends of the prongs 64 and 70 each reach the base of the corresponding socket.

Measurement module 14 in the illustrated embodiment is provided with optic fibers 76 and 78 that extend in light receiving and transmitting relation respectively to the base ends of sockets 72 and 74 in such manner as to align with optic fibers 68 and 62 when the modules are fully engaged. Fiber 76 extends longitudinally within module 14 to splitter 80, in this case a fiber optic receiver that demodulates the input light information and provides a corresponding electronic digital signal via interface 82 to data and control bus 84, while also regenerating a corresponding light output to fiber 86 by means of an internal light emitting diode. Fiber 86 proceeds coaxially within a connecting end prong 88, located at the opposite end of module 14 from socket 72, for communicating with the next measurement module 16 in line. Prong 90, disposed in spaced, parallel relation with prong 88, coaxially contains optic fiber 92 for conveying information to a splitter 94 wherein the light signal is regenerated for presentation to fiber 78, while also applying an electronic digital signal through interface 96 to bus 84.

Bus 84 is connected to microcontroller 98, which includes internal memory, as well as to measurement system or circuit 100. A sensor or sensor circuit 102 is interconnected with circuit 100. The measurement circuit 100 together with sensor 102 comprises a conventional measuring circuit and is suitably adapted to register temperature, humidity, radiation, concentration of a particular gas, air pressure, or any one of a number of environmental parameters, but sensor 102 is physically isolated from the interior of module 14, i.e., within cavity 104, except for electrical connections, so that a substance received within cavity 104 will not be destructive of the internal modular circuitry. The sensor is exposed to the environmental factors to be measured via slots 106 (FIG. 1).

Bus 56 in module 12 is also suitably coupled via optic transmitter 108 and optic receiver 110 to fibers 112 and 114 respectively ending in a slot 116 by means of which external communication can be provided to a transceiver plug as hereinafter more fully described in connection with FIG. 5.

Also, bus 84 in module 14 may be coupled to optic transmitter 118 and optic receiver 120 which couple respectively to fibers 122 and 124 ending at slot 126. Each of the units is provided with an independent power supply, e.g. a battery 128, sealed within the units.

Measurement module 16 and beyond are disposed in aligned relation with modules 12 and 14 and receive and transmit information on optic fibers located within successive end prongs and prong receiving sockets. The measurement models beyond module 14, e.g. module 16 etc., are suitably the same in general construction as module 14 but are provided with different sensors and in some cases with different measurement circuitry 100 as appropriate to provide a required measurement. Thus, a module 18 as depicted in FIG. 1, rather than having internal sensor means, is instead provided with test leads 130 and 132 engageable via lead tips with respective sockets 134 and 136 connecting to the measurement circuit within module 18. In the FIG. 1 example, leads 130 and 132 are supplied at ends thereof with alligator clips 138 and 140 and may be connected to an external voltage measuring point, an external transducer, or to a circuit the resistance of which is to be measured. Other transducers are similarly connected to a measurement module such as measurement model 18 in a corresponding manner, but instead of employing test leads as shown, may, for example, utilize one or more capillary tubes extending into a solution for the purpose measuring the pH of such solution via a transducer (at 102) located within the measurement module. Any convenient number of measurement modules may be assembled.

Referring to FIG. 5, a detachable interface means for removably connecting the control module 12 to the external command computer 40 (FIG. 2) is illustrated. A transceiver plug 142 contains an optic transmitter and an optic receiver for communicating with receiver 110 and transmitter 108 in FIG. 4. The corresponding signals are coupled via cable 144 which may comprise an electrical or fiber optic cable. Plug 142 is received within slot 116 and may be located in place to provide information to control module 12, and/or receive data therefrom. The same plug can be utilized for interchanging information with transmitter 118 and receiver 120 in a measurement module 14.

Considering overall operation of the present invention, initial program information is downloaded from command computer 40 via transceiver plug 142 whereby memory 58 receives a program containing desired measurement sequences. Microprocessor 54 by way of the optic links provided by fibers 62, 68, 76, 78, etc. addresses and directs the various measurement modules 14, 16, etc. via their local microcontrollers to undertake continuous or periodic measurements. Such data may be directly accessed by processor 54 in module 12 or temporarily stored in microcontroller 98 and then accessed by microprocessor 54 for storage in memory 58 so that it may be retrieved at a later time by the command computer, after the process in question has been completed, for analysis and display on the display monitor 44. As hereinbefore mentioned, the information may be read out to computer 40 by means of transceiver plug 142 from module 12, with module 12 removed or still engaged to the product. The various measurement modules are capable of operating substantially independently for periods of time. The fiber optic members 62, 68, 76, 78, etc. are suitably aligned as shown, although other physical configurations are possible.

Optic communication links are employed throughout the chain of modules and are preferred since they are less likely to be deleteriously affected by their environment. Placement of fiber optic interfaces at the bottoms of sockets 72, 74, etc. provides some protection and freedom from contamination. Limited information can be reloaded/retrieved directly from the measurement modules with the transceiver plug aligned with fibers 122 and 124, if desired, instead of as shown in FIG. 5.

Many examples of processes to which the present invention is applicable can be given. The logging apparatus 10 is appropriate for attaching to the chassis of an automobile or large vehicle being manufactured for logging data during both a manufacture and testing cycle. On the other hand, the apparatus may be attached to a small printed circuit board or the like undergoing a flow soldering procedure, or the apparatus may be submersed with a product in a bath or acid etch. Other harsh environments within which the present invention is useful include high temperature processing wherein the logging apparatus may be attached to a product receiving oven treatment, e.g. a product requiring a baked-on finish. In addition to products specifically undergoing manufacturing, the present invention is applicable to any unit the history of which is desired during its life, use or movement. Thus, the present invention is applicable for attachment to boxes of produce being shipped from place to place for providing a record of factors such as temperature and gaseous concentration.

Although the measurement and control modules have hereinbefore been described as formed of metal, plastic, ceramic or the like, it can be advantageous to form the exterior enclosure of each module from an elastomeric material so the module can be closely adhered as by an adhesive substance to an irregular or curved surface. The communication channel between modules can be formed of flexible, flat conductor cables or flexible fiber optic links appropriately joining spaced modules and provided with sealable connecting means at the module end walls.

While preferred embodiments of the present invention have been shown and described, it will be apparent to those skilled in the art that many other changes and modifications may be made without departing from the invention in its broader aspects. The appended claims are therefore intended to cover all such changes and modifications as fall within the true spirit and scope of the invention.

We claim:

1. Apparatus for logging parameters to which a movable unit in a process environment is subjected, said apparatus comprising:

a plurality of separable modules including at least one measurement module provided with sensor means for measuring an environmental parameter, and at least one control module for operating said measurement module;

said control module including microprocessor means for programming a measurement sequence, detachable interface means for connection to an external command center, and memory means for storing instructions and measured data;

attachment means for removably attaching said measurement and control modules physically to said unit for movement with said unit;

first linking means positioned in communicating relation between said measurement and control modules when said modules are physically attached to said unit for transmitting instructions from said control module to said measurement module in order to direct measurement of said parameters and for returning data from said measurement module to said control module for storage in said memory means; and said measurement module including second linking means adaptable for communication between said measurement module and another measurement module for transmitting instructions from said control module to said other measurement module, and said first and second linking means being operable separately from said detachable interface means so as to facilitate simultaneous data transmittal by said measurement module and connection of said control module to an external command center.

2. The apparatus according to claim 1 wherein said measurement and control modules are removably attached to one another.

3. The apparatus according to claim 2 wherein said modules are attached to one another in serial, in-line relation.

4. The apparatus according to claim 1 wherein said first and second linking means comprise optical communicating means.

5. The apparatus according to claim 1 wherein each module is provided with an independent power source.

6. The apparatus according to claim 1 comprising one said control module and a plurality of said measurement modules controlled by said control module.

7. The apparatus according to claim 6 wherein said first and second linking means comprise optic communicating means and wherein said modules are disposed serially in-line having said optic communicating means extending through intermediately placed modules in an in-line configuration.

8. The apparatus according to claim 7 including plural prongs extending from ones of said modules for making physical connection with sockets in an adjoining module.

9. The apparatus according to claim 8 wherein said optic communicating means comprise fiber optic means disposed substantially coaxially within said prongs and sockets, providing communication at an interface between a fiber optic member extended to an end of a said prong and an aligned fiber optic member at the base of a said socket.

10. The apparatus according to claim 1 further including an external command computer for programming a said control module.

11. The apparatus according to claim 10 wherein said external command computer is provided with a display and an input keyboard.

12. The apparatus according to claim 10 wherein said detachable interface means comprises a demountable optic link.

13. The apparatus according to claim 12 wherein said demountable optic link comprises an optic transceiver plug connected to said command computer and wherein said control module is provided with a socket in the form of a slot for removably receiving said plug, said control module providing an optic interface with said plug at said slot.

14. The apparatus according to claim 1 wherein said modules are formed of material substantially impervious to said environment.

15. The apparatus according to claim 1 wherein a said sensor means is provided at least in part internally of the corresponding measurement module.

16. The apparatus according to claim 1 wherein a said sensor means is provided externally of the corresponding measurement module, and further including means for connecting said sensor means to the said measurement module.

17. A method of logging parameters to which a movable unit is subjected in a process environment, said method comprising:

attaching at least two measurement modules and at least one control module to said unit for moving through said process with said unit, said modules connected to each other in a series arrangement, taking measurements with said at least two measurement modules under the direction of the said at least one control module, returning measurement data as taken by said at least two measurement modules for storage in said at least one control module, and transmitting measurement data from said control module to an external command module without disrupting the step of taking measurements by said at least two measurement modules.

18. The method according to claim 17 further including subsequently retrieving measurement data as stored in said at least one control module for external use.

19. The method according to claim 17 including transmitting data and control information optically.

20. The method according to claim 17 including physically attaching said modules to one another.

21. The method according to claim 20 comprising attaching said modules together in an in-line configuration.

22. Apparatus for logging parameters to which a unit is subjected in a process environment, said apparatus comprising:

at least one measurement module removably attached to said unit, a control module including linking means, the control module being removably attached to said unit and adapted for directing operation of said measurement module and for receiving measurement data from said measurement module through said linking means, said control module having memory means for storing said measurement data received from said measurement module and having external communication means separate from said linking means, and external command computer means including means detachably connectable to said external communication means of said control module for operating said control module and receiving measurement data from said memory means while said control module is attached to said unit, said separate external communication means and linking means facilitating simultaneous data measurement by the measurement module and receipt of measurement data by said external command computer.

23. The apparatus according to claim 22 wherein said measurement and control modules are removably attached to one another physically.

24. The apparatus according to claim 22 including optic linking means for communicating between said measurement and control modules, and between said control module and said external command computer means.

25. The apparatus according to claim 22 wherein said modules attached to said unit are disposed physically in-line.

26. The apparatus according to claim 22 wherein said modules are sealingly enclosed and formed of materials substantially impervious to said environment.

27. The apparatus according to claim 26 including optic linking means for communicating between said modules without compromising the sealing enclosure of said modules.

28. Apparatus for logging environmental parameters to which a unit may be exposed, said apparatus comprising:

measurement and control means connected by linking means and being removably attachable to said unit so as to be adapted for movement with said unit, said control means including storage means for storing measurements taken by said measurement means under control of said control means and including external communication means, and external readout means separate from said unit and from said measurement and control means and operatively connectable to said external communication means for receiving data as stored in said storage means without disrupting connection by said linking means of the measurement and control means.

29. The apparatus according to claim 28 wherein said measurement means and control means are formed of materials substantially impervious to the unit's environment.

30. The apparatus according to claim 29 including optic means for communicating between said measurement, control and readout means.

31. The apparatus according to claim 1 further comprising another measurement module, said other measurement module communicating with said second linking means such that said second linking means transmits instructions from said control module to said other measurement module and returns data from said other measurement module to said control module for storage in said memory means.

32. The apparatus according to claim 1 further comprising a plurality of measurement modules connected in a series relationship.

33. The apparatus according to claim 1 wherein said control module includes external communication means adapted for communication between an external device and said control module when said control module is physically attached to said unit and is positioned in communicating relation with said at least one measurement module.

* * * * *